United States Patent
Zhao et al.

(10) Patent No.: US 11,915,719 B1
(45) Date of Patent: Feb. 27, 2024

(54) DATA STORAGE DEVICE WITH SERVO CONTROL PROCESSOR WITH INITIAL FAST LOCK OF DISK LOCK CLOCK

(71) Applicant: WESTERN DIGITAL TECHNOLOGIES, INC., San Jose, CA (US)

(72) Inventors: Yuanyuan Zhao, Irvine, CA (US); Yongzhi Liu, Fujisawa (JP); Shravankumar Bhat, Broomfield, CO (US); Gary Herbst, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/951,490

(22) Filed: Sep. 23, 2022

(51) Int. Cl.
*G11B 17/02* (2006.01)
*G11B 5/55* (2006.01)
*G11B 20/10* (2006.01)

(52) U.S. Cl.
CPC ............ *G11B 17/02* (2013.01); *G11B 5/5547* (2013.01); *G11B 20/10222* (2013.01)

(58) Field of Classification Search
None
See application file for complete search history.

(56) References Cited

U.S. PATENT DOCUMENTS

| | | | | | |
|---|---|---|---|---|---|
| 5,303,216 | A | * | 4/1994 | Shinoda | G11B 7/094 369/44.37 |
| 5,528,573 | A | * | 6/1996 | Shim | G11B 19/28 369/47.48 |
| 5,535,183 | A | * | 7/1996 | Miura | G11B 19/24 |
| 5,808,979 | A | * | 9/1998 | Ishibashi | G11B 7/0941 |
| 6,023,145 | A | * | 2/2000 | Karaaslan | G11B 5/5565 |
| 6,067,206 | A | * | 5/2000 | Hull | G11B 5/59688 360/77.02 |
| 6,185,665 | B1 | * | 2/2001 | Owada | G06F 3/0643 711/170 |
| 6,954,324 | B1 | * | 10/2005 | Tu | G11B 19/28 360/73.03 |
| 7,369,345 | B1 | * | 5/2008 | Li | G11B 5/5582 360/73.03 |

(Continued)

FOREIGN PATENT DOCUMENTS

| | | |
|---|---|---|
| CN | 101241708 A | 8/2008 |
| JP | 06-046479 B * | 6/1994 |

OTHER PUBLICATIONS

Machine Translation of Miura et al., JP 06-046479 B, Jun. 15, 1994.*

*Primary Examiner* — Peter Vincent Agustin
(74) *Attorney, Agent, or Firm* — CALDERON, SAFRAN & COLE PC

(57) ABSTRACT

Various illustrative aspects are directed to a data storage device, comprising one or more disks; an actuator mechanism configured to position heads proximate to a recording medium of the disks; a spindle motor configured for rotating the one or more disks; and one or more processing devices comprising a servo control processor. The servo control processor is configured to receive a spindle speed error signal indicative of an error in a rotational speed of the spindle motor. The servo control processor is further configured to output an initial frequency offset signal, wherein the initial frequency offset signal is proportional to the spindle speed error signal.

19 Claims, 4 Drawing Sheets

(56) References Cited

U.S. PATENT DOCUMENTS

| | | |
|---|---|---|
| 7,864,464 B2 | 1/2011 | Bliss et al. |
| 7,974,035 B2 | 7/2011 | Bliss et al. |
| 8,711,505 B2 | 4/2014 | Grundvig et al. |
| 8,780,477 B1 | 7/2014 | Guo et al. |
| 10,522,177 B1 | 12/2019 | Bellorado et al. |
| 2002/0171972 A1* | 11/2002 | Izumi .................. G11B 25/043 360/99.16 |
| 2003/0065419 A1* | 4/2003 | Fujishima .............. B23Q 23/00 700/193 |
| 2004/0246833 A1* | 12/2004 | Ehrlich ................ G11B 5/5582 369/47.36 |
| 2008/0007855 A1 | 1/2008 | Vityaev et al. |
| 2011/0085262 A1 | 4/2011 | Grundvig et al. |

\* cited by examiner

DATA STORAGE DEVICE WITH SERVO CONTROL PROCESSOR WITH INITIAL FAST LOCK OF DISK LOCK CLOCK

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ ("servo wedges 6") recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge 6i comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

SUMMARY

Various examples disclosed herein provide data storage devices such as hard disk drives with control circuitry that may be enabled to establish servo control and commence read/write operations substantially more quickly after the heads are loaded onto the disks, and after the disk drive transitions from back EMF (BEMF) mode to servo control mode, than in conventional disk drives, among various inventive advantages. An example disk drive of this disclosure comprises a servo control processor comprising a novel frequency offset initializer, in addition to a proportional-integral feedback closed-loop control circuit. When the disk drive initiates servo control by the servo control processor, the servo control processor receives a detected rotational spindle speed error signal. The frequency offset initializer applies an initial frequency offset control signal proportional to the spindle speed error, as the initial output of the servo control processor and feeding back into the input of the feedback closed-loop control system, and converging the servo control signal substantially more quickly than is possible via the feedback closed-loop control circuit alone. A frequency offset initializer of this disclosure thereby enables a substantially more rapid start to servo control and to read/write operations, in various examples, among other inventive advantages.

Various illustrative aspects are directed to a data storage device, comprising one or more disks; an actuator mechanism configured to position heads proximate to a recording medium of the disks; a spindle motor configured for rotating the one or more disks; and one or more processing devices comprising a servo control processor. The servo control processor is configured to receive a spindle speed error signal indicative of an error in a rotational speed of the spindle motor. The servo control processor is further configured to output an initial frequency offset signal, wherein the initial frequency offset signal is proportional to the spindle speed error signal.

Various illustrative aspects are directed to a method comprising receiving, by one or more processing devices, a spindle speed error signal indicative of an error in a rotational speed of a spindle motor configured for rotating one or more disks of a data storage device. The method further comprises outputting, by the one or more processing devices, an initial frequency offset signal, wherein the initial frequency offset signal is proportional to the spindle speed error signal.

Various illustrative aspects are directed to one or more processing devices comprising means for receiving a spindle speed error signal indicative of an error in a rotational speed of a spindle motor configured for rotating one or more disks of a data storage device. The one or more processing devices further comprise means for outputting an ongoing control signal from the closed-loop control system, after receiving the initial frequency offset signal proportional to the spindle speed error signal as an input to the closed-loop control system.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
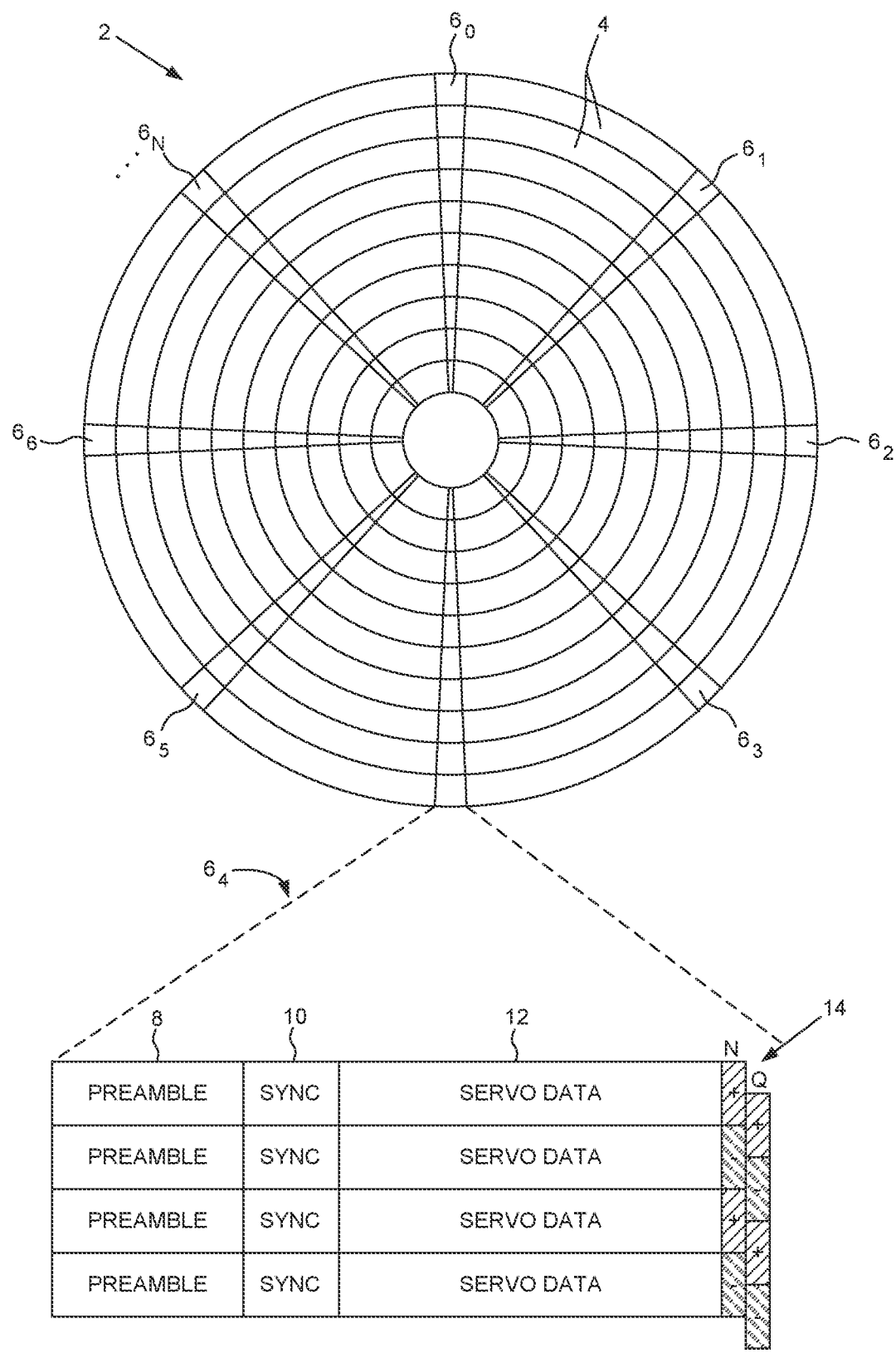
FIG. 1 shows a prior art disk format as comprising a number of radially-spaced, concentric servo tracks defined by servo wedges recorded around the circumference of each servo track.
Figure 2:
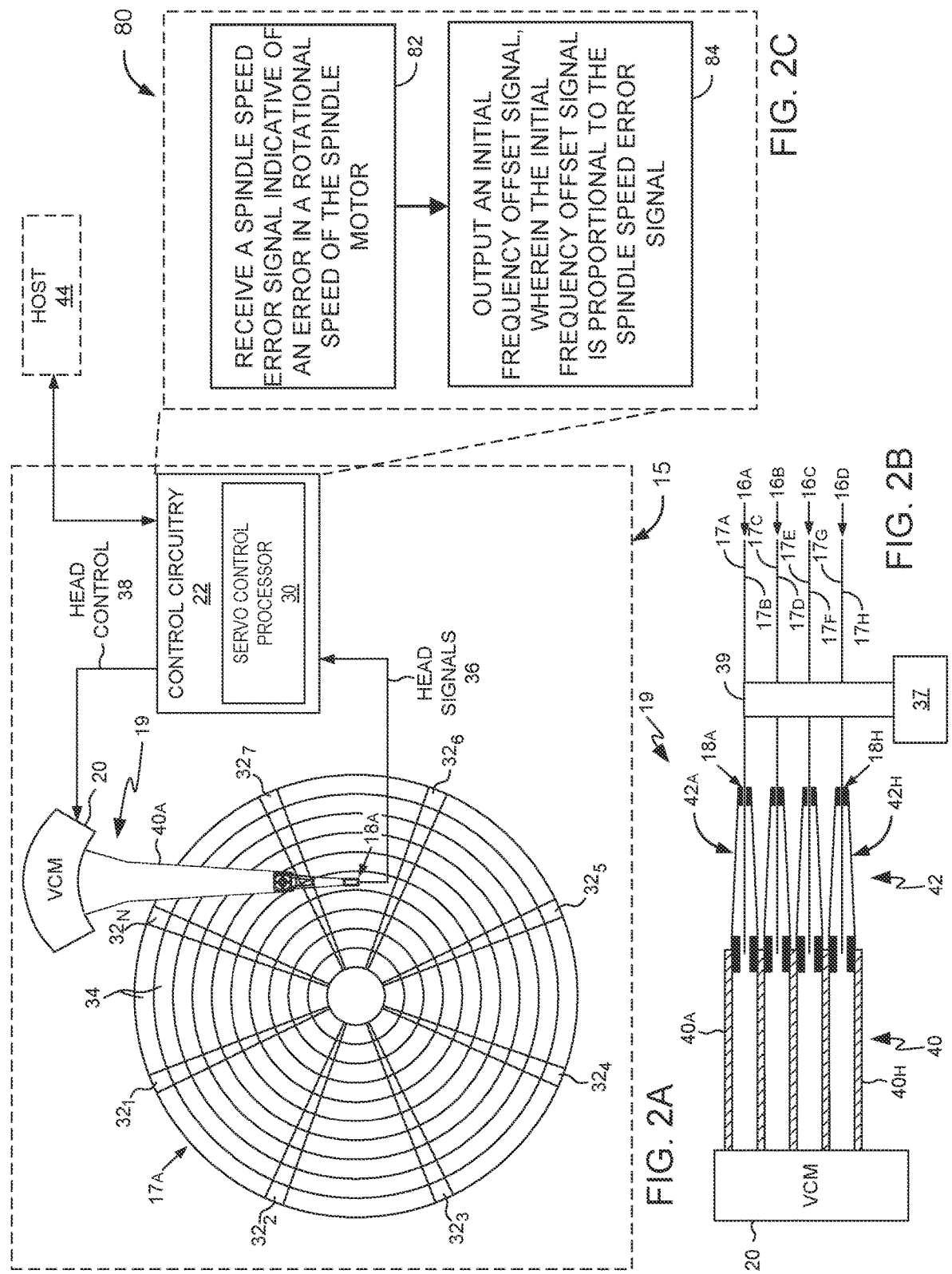
FIGS. 2A and 2B illustrate conceptual block diagrams of a top view and a side view of a data storage device in the form of a disk drive, in accordance with aspects of the present disclosure.
FIG. 2C depicts a flowchart for an example method that control circuitry of a disk drive may perform or execute in controlling the operations of the disk drive, including for initializing a frequency offset control signal, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, a plurality of hard disks 16A, 16B, 16C, 16D ("hard disks 16") mounted on a spindle axis 39, and a spindle motor 37 configured to rotate spindle axis 39 and thereby rotate disks 16. Control circuitry 22 comprises a servo control processor 30, configured for performing servo control. FIG. 2C depicts a flowchart for an example method 80 that control circuitry 22 of disk drive 15 may perform or execute in controlling the operations of disk drive 15, in accordance with aspects of the present disclosure, including operations involved in initializing a frequency offset control signal. Servo control processor 30 may receive a spindle speed error signal indicative of an error in a rotational speed of spindle motor 37, and output an initial frequency offset signal, wherein the initial frequency offset signal is proportional to the spindle speed error signal, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators (e.g., milli-actuators, microactuators), in some examples.

Each of actuator arms 40 is configured to suspend one of read/write heads 18 ("heads 18") in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, five or more disks, and ten or eleven or more disks, in various examples. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$ ("servo wedges 32"), which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from servo wedges 32 using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples.

Disk drive 15 may start up, and perform a process of loading heads 18 onto disks 16 and beginning or resuming read/write operations, after first powering on or after resuming operations after a standby mode in which the heads have been unloaded off of disks 16 onto their ramps. During a typical start-up of disk drive 15, disk drive 15 starts in a back EMF (BEMF) control mode, during which the heads are first loaded onto the disks, and then the disk drive hands off control from BEMF mode to control by specialized servo control processor 30, which operates servo control firmware (FW), and which may be hardware-assisted firmware.

Servo control processor 30 implements, via hardware and/or firmware, a disk lock clock (DLC). The disk lock clock comprises a feedback closed-loop timing control for disk drive 15 to lock onto the servo patterns on disk surfaces 17, and implement effective servo control. The disk lock clock serves disk drive 15 as a reference clock that synchronizes, at high frequency, effectively "constantly" for applicable purposes, with the rotational spindle speed, along with any minor variations thereof (due e.g. to minor disk eccentricities, and/or timing variations as the disks spin), and tracks and compensates for those minor variations, also at high frequency and effectively "constantly" for applicable purposes of the disk lock clock for servo control and read/write operations control, and with the understanding that servo synchronization is based on highly frequent but intermittent servo signals. The rotational spindle speed may be measured and referred to in terms of rotational frequency, e.g., in revolutions per minute (RPM), with appropriate conversion between rotational speed and rotational frequency.

Servo control processor 30 can only initiate the disk lock clock after disk drive 15 has transferred control from BEMF mode to servo control processor 30, and then after servo control processor 30 has initialized and converged its closed-loop control signal. The disk lock clock forms the timing reference, and thus a key element of the control system, for both servo control and for the read/write logic for disk drive 15 to carry out read/write operations.

During start-up of disk drive 15, control circuitry 22 typically hands off control to servo control processor 30 and for servo control processor 30 to start the disk lock clock while the spindle motor speed of disks 16 is not yet fully settled, after the spindle speed is perturbed in the loading of heads 18 onto close proximity with disk surfaces 17, during power-on or resumption after being offloaded, e.g., in a standby mode. Servo control processor 30 may implement the disk lock clock with the closed-loop control system, which may illustratively include a second-order proportional-integral (PI) disk lock clock feedback closed-loop control circuit. A typical prior art servo control processor starts the disk lock clock control loop with an integral error of zero. Among the inventive insights of this disclosure is that, with the spindle speed not fully settled and with the zero integral error feeding into the proportional-integral closed-loop control circuit, there is typically a large transient after the servo control processor starts the disk lock clock closed-loop control circuit. This typically causes the disk lock clock response to fail to converge for a substantial time interval (e.g., multiple tenths of a second, or other substantial fraction of a second) after the disk lock clock is initiated, covering a substantial number of passes of heads 18 over servo wedges 32, after disk drive 15 is otherwise ready to start read/write operations, but for the persisting transient, non-converged disk lock clock signal.

Without the disk lock clock signal yet being converged, the disk lock clock signal does not provide control circuitry 22 with a reliable reference basis with which to process other operational control signals (e.g., dynamic fly height (dFH) data), and may thereby degrade the quality of control signal factors that enable effective servo control and read/write data quality, during that non-converged time interval. The persistence of the initial disk lock clock pre-convergence error is thus typically too great to enable accurate control, and thereby prevents being able to perform accurate read/write operations, in those conventional disk drives. In a typical example, a prior art servo control processor requires the current timing error to converge to within a 0.08% threshold value before the feedback closed-loop control circuit of servo control processor 30 is able to correct for spindle speed error and enable nominal control, thereby enabling accurate read/write operations. Temporary fixes for these issues have been attempted in the prior art, such as adding a substantial time delay before initiating read/write operations, to allow time for the disk lock clock control signal to converge. However, such delays are unwanted and run counter to performance goals, and attempting to balance the convergence blackout delay against competing performance criteria may still not suffice to enable spindle speed to settle and for the proportional-integral closed-loop control signal to converge nominally for all nominal performance purposes, for an interval of time after the blackout delay.

Disk drive 15 implementing aspects of this disclosure may resolve issues such as those described above, and converge a disk lock clock control signal far more rapidly after startup or after other loading of heads 18 onto disks 16, and ensure prompt nominal data quality of read/write operations, substantially more rapidly after servo control handoff than is possible in conventional disk drives, among other inventive advantages. In various aspects, during startup of disk drive 15, and during resumption of servo control after loading heads 18 back onto disks 16 after being unloaded or in standby mode, servo control processor 30 and/or other control circuitry 22 of disk drive may implement a novel disk lock clock control system that detects a spindle speed error, prior to or at approximately the same time as initiating operation of the disk lock clock, and then initializes its disk lock clock proportional-integral closed-loop control circuit with an initial, one-time, feedforward frequency offset control signal, proportional to the detected spindle speed error. This initial spindle-speed-proportional frequency offset control signal forms the initial frequency offset control signal of servo control processor 30, and feeds back to the inputs of servo control processor 30, initializing the current timing error that is input to the proportional-integral closed-loop control circuit with an initial input that starts out the proportional-integral closed-loop far closer to its target output than starting with zero integral error, as in conventional disk drives.

This one-time initialization with a frequency offset control signal proportional to the detected spindle speed error may ensure that the response of the disk lock clock is already well-converged close to or by the time the disk drive is otherwise ready to start read/write operations, quickly after the first servo wedge read after servo control is initiated, and without any need to impose a compensatory delay to wait for the servo control signal to converge after it is initiated. In other words, control circuitry 22 of this disclosure may be enabled to initialize servo control with a speed that may be modeled as being hardware-limited rather than convergence-limited, where the speed of initiating servo control is limited only by the physical limits of data communication and processing from the servo control processor's first read of a servo signal, rather than being limited by the time required for closed-loop signal convergence for an unassisted proportional-integral closed-loop control circuit to process several servo wedge signals and several closed-loop feedback cycles from a starting point integral error of zero.

The one-time initialization of disk lock clock control may thus substantially reduce initial closed-loop timing error due to large spindle speed error after loading the heads onto the disks, and allow the disk lock clock closed-loop control by servo control processor 30 to start operating as soon as possible, e.g., as soon as servo control processor 30 is able to process the first servo signal encountered and read by heads 18 from disk drive surfaces 17 after control hand-off from BEMF mode to servo control processor 30, and for servo control processor 30 to perform a seek operation and guide heads 18 to arrive on an initial target track. Disk drive 15 may then initiate read and write operations nominally, as rapidly as possible within the physical hardware limits, after heads 18 arrive on track and read their first servo wedge, and with no need to impose a delay on read and write operations. Compared to conventional firmware disk lock clock schemes, a disk lock clock fast lock in examples of this disclosure has the inventive advantage of starting disk lock clock closed-loop control by servo control processor 30 as quickly as possible, after the first available servo sample, after switching from BEMF load to realtime mode under the control of servo control processor 30, and reliable switching to realtime mode, among other inventive advantages.

Servo control processor 30 may read the first available servo signal from the first servo wedge 32 on each disk surface 17, in disk drive 15 as shown in FIGS. 2A-2C. In other example disk drives of this disclosure with more than one disk, the servo wedges may form vertically aligned stacks, on the surfaces of either side of each disk and from one disk to another in the stack of disks, such that the servo wedges are aligned with each other in vertical stacks of servo wedges. In example disk drives in various examples of this disclosure with a single disk, each side of the disk may typically have servo wedges written thereon and used in servo control, so the vertically aligned servo wedges on either side of the disk may form a vertical stack of disks. In various examples of this disclosure, a disk drive may comprise a split actuator arm assembly with a common primary actuator pivot axis and/or multiple actuator arm assemblies with multiple primary actuator pivot axes, such that one or more heads or sets of heads of one actuator arm assembly may encounter and read corresponding servo wedges a short time interval prior to one or more heads of one or more additional actuator arm assemblies encountering and reading corresponding servo wedges.

In these and other examples (of which the example of FIGS. 2A-2B is one example), one or more heads in a vertical stack of heads, across the actuator arm assembly that is first in reading servo signals, may encounter and read corresponding servo wedges on corresponding disk surfaces in a vertical stack of servo wedges, vertically spread across the disk surfaces of one or more disks, and where "vertical" may be defined with reference to the orientation of the disk drive (e.g., as parallel with the spindle axis 39 of the stack of disks 16, in the example of FIGS. 2A-2B). In these and other examples, a servo control processor of a disk drive may detect a spindle speed error based on the first servo data it reads from any one or more servo wedges that any of the heads read first, and generate a spindle speed error signal based on that first-received servo data. A servo control processor in these and other various examples of this disclosure may receive the spindle speed error signal, and output an initial frequency offset signal, proportional to the spindle speed error signal. A servo control processor may thus receive the first servo control signal read by the one or more heads from one or more servo wedges in a vertical stack of servo wedges, detect the spindle speed from the servo signal read and received from the vertical stack of servo wedges, and apply the initial frequency offset control signal based on the servo signal from that first vertical stack of servo wedges read by the heads after the control circuitry initiates control by the servo control processor, in various examples of this disclosure.

Returning to the example depicted in FIGS. 2A-2B, servo control processor 30 may apply the initial frequency offset control signal proportional to the spindle speed error. The current timing error of the proportional-integral control closed-loop of the servo control processor may then converge to within a convergence threshold. The convergence threshold for the proportional-integral control closed-loop of the servo control processor may be within 0.08% of the nominal current timing error, in one illustrative example, and may be demarcated at different values greater or less than 0.08% of the nominal current timing error in other examples, consistent with a usefully converged current timing error signal. In various examples, servo control processor 30 may detect that its current timing error converges to within its current timing error threshold. Servo control processor 30 may transition to proportional-integral closed-loop control, in response to the current timing error converging to within the current timing error threshold, in various examples. Servo control processor 30 may deactivate the frequency offset initializer, in response to the current timing error converging to within the current timing error threshold, in various examples.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, servo control processor 30 of control circuitry 22 may receive a spindle speed error signal indicative of an error in a rotational speed of the spindle motor (82). Servo control processor 30 may further output an initial frequency offset signal, wherein the initial frequency offset signal is proportional to the spindle speed error signal (84).

Control circuitry 22 may further perform additional actions, methods, and techniques, in accordance with various aspects including as further described herein. A servo control processor of this disclosure may encompass any one or more circuits, processors, and/or processing components that perform, implement, embody, and/or execute any aspect of this disclosure. All of the methods and functions of this disclosure relate generally to servo control, and any of control circuitry 22 or any circuitry and/or any one or more processors that perform, implement, embody, and/or execute any of the methods and functions of this disclosure may be encompassed within a servo control processor of this disclosure, within the meaning of the term "servo control processor" for purposes of this disclosure, other than any clear exceptions in which other control circuitry 22 performs functions outside of servo control, such as implementing BEMF mode prior to servo control mode. One or more processing devices of control circuitry 22 may also initialize control by servo control processor 30, and servo control processor 30 may respond to receiving control by performing and implementing methods and functions of this disclosure.

Figure 3:
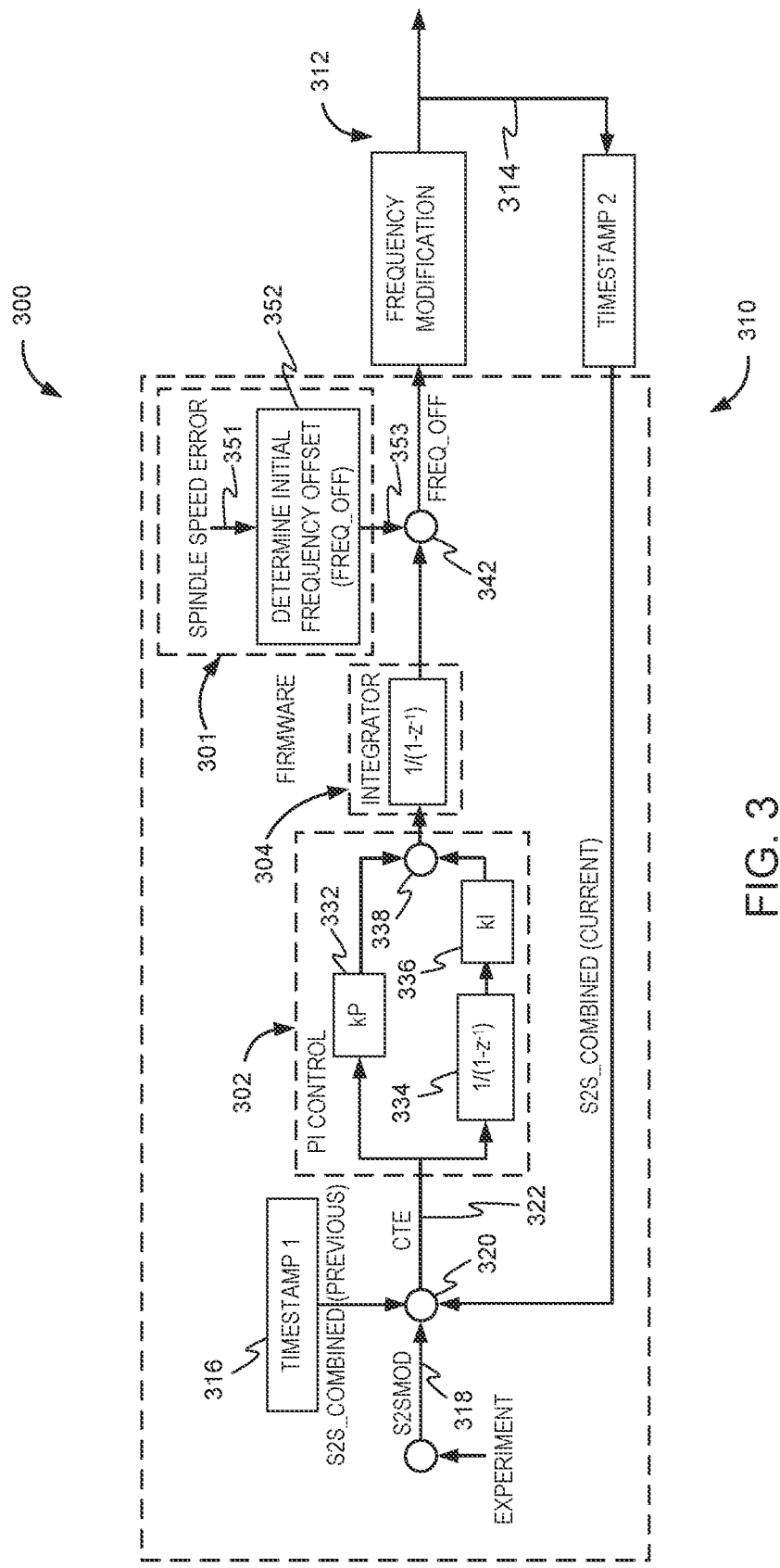
FIG. 3 illustrates a conceptual circuit diagram of a servo control processor comprising a proportional-integral feedback closed-loop control circuit and a frequency offset initializer, in accordance with aspects of the present disclosure.

FIG. 3 depicts a conceptual circuit diagram of a specialized, realtime, servo control processor 300 comprising a proportional-integral (PI) feedback closed-loop control circuit 310 and a frequency offset initializer 301, in accordance with aspects of this disclosure. Servo control processor 300 also comprises a proportional-integral control circuit 302 and a summed output integrator 304. Servo control processor 300 comprises a signal output line 312 by which servo control processor 300 outputs a control output signal, e.g., a frequency offset signal for a disk lock clock control signal, for control circuitry 22 to use as a disk lock clock control reference for purposes such as servo control and read/write operational control, in various examples. The control output signal may also be referred to or interpreted as or form the reference basis for tracking a servo wedge to servo wedge offset time signal, or a time stamp signal.

During initial operation, in response to servo control processor 300 first being activated, first coming on line, or first being enabled for control or "handed" control by other elements of control circuitry 22 of FIG. 2A (e.g., in a transition from BEMF mode to servo control mode), servo control processor 300 may initiate its operations with frequency offset initializer 301. Control circuitry 22 may detect a spindle speed error signal, indicative of an error in a rotational speed of the spindle motor, and output the spindle speed error signal to a spindle speed error signal input line 351 of frequency offset initializer 301. In some examples, frequency offset initializer 301 may detect the spindle speed error, and output the spindle speed error signal, indicative of the spindle speed error, via spindle speed error signal input line 351 to frequency offset initializer 301 of servo control processor 300. In other examples, one or more other subcomponents of control circuitry 22 may detect the spindle speed error, and output the spindle speed error signal based on the spindle speed error via spindle speed error signal input line 351 to frequency offset initializer 301 of servo control processor 300.

Servo control processor 300 may thus detect the error in the rotational speed of the spindle motor, which may include detecting the spindle speed via receiving a servo read signal from performing a read operation via one or more of heads 18 of one or more of servo wedges 32 on one or more of disk surfaces 17. Servo control processor 300 detecting the spindle speed may further include servo control processor 300 receiving the servo read signal from performing a read operation via one or more of heads 18 of a first vertical stack, vertically across disks 16 (or across the two surfaces of a single disk 16) of servo wedges 32 encountered by heads 18 after control circuitry 22 initializes control by servo control processor 30.

Frequency offset initializer 301 receives, via spindle speed error signal input line 351, the spindle speed error signal. Frequency offset initializer 301 comprises processing block 352 (e.g., hardware and/or firmware) that calculates and/or determines an initial frequency offset signal, such that the initial frequency offset signal is proportional to the spindle speed error signal. Frequency offset initializer 301 outputs, from processing block 352 via frequency offset initializer output line 353, an initial frequency offset signal, such that the initial frequency offset signal is proportional to the spindle speed error signal. Frequency offset initializer 301 outputs the frequency offset signal to summation node 342 which is coupled to servo control processor output line 312, in this example. In initiating operations, there may be no other signal feeding into summation node 342, and the output of frequency offset initializer 301 thus becomes the output of servo control processor 300, as well as the initial feedback signal to the input of servo control processor 300. Frequency offset initializer 301, and servo control processor 300 as a whole, are thereby configured to output an initial frequency offset signal, wherein the initial frequency offset signal is proportional to the spindle speed error signal.

Servo control processor 300 also comprises a feedback line 314, coupled to servo control processor output line 360, by which servo control processor 300 feeds the control output signal back as an input to closed-loop control circuit 310. Servo control processor 300 also comprises a previous time stamp memory register 316 where servo control processor 300 iteratively stores an immediately previously received time stamp signal received via feedback line 314. Thereby, servo control processor 300 iteratively, at high frequency, compares a current time stamp with an immediately previous time stamp, at comparator node 320, and generates, as a comparison output, a current timing error signal via current timing error line 322. The time stamps are samples of timing variations; if the spindle motor is operating ideally, at a constant rotational speed, the time stamp intervals are identical, and the current timing error is then zero. Servo control processor 300 may also comprise a servo wedge to servo wedge modification input line 318, which may also be coupled as an input to comparator node 320, and by which the current timing error and the operations of servo control processor 300 may be subjected to experimentation, testing, or verification, for example.

Servo control processor 300 feeds the current timing error signal as input to proportional-integral control circuit 302, which comprises a proportional control component 332, an integral integrator 334, and an integral control component 336. Proportional control component 332 multiplies the current timing error signal by a proportional gain factor. Integral integrator 334 subjects the current timing error to a transfer function integration computation, the output of which is fed to integral control component 336, which calculates an integral of the current timing error signal over time, multiplied by an integral gain factor. Proportional-integral control circuit 302 then performs a weighted summation via summation node 338 of the outputs of proportional control component 332 and integral control component 336, as the output of proportional-integral control circuit 302, which is fed to a summed output integrator 304.

As described above, servo control processor 300 comprises summation node 342. Summation node 342 may perform a weighted summation of the output of the summed output integrator 304 and of frequency offset initializer 301. In various examples, servo control processor 300 may begin operation with summation node 342 weighted 100% on the signal from frequency offset initializer 301, and with zero weight on the signal line from proportional-integral control circuit 302 and summed output integrator 304. In various examples, servo control processor 300 may modify the weighting of summation node 342 over time and/or in response to detecting changing conditions. In various examples, servo control processor 300 may detect convergence of the current timing error, and transition the weighting applied to summation node 342 in response to detecting convergence of the current timing error. In some examples, servo control processor 300 may use summation node 342 as a switch, and completely switch over to the output from proportional-integral control circuit 302 and summed output integrator 304 after initial startup, either after a selected interval of initialization time, or in response to a changed condition, such as in response to detecting current timing error converging to within a convergence threshold. In various examples, servo control processor 300 may implement transitions of any of various levels of complexity from the initial proportional frequency offset initializer signal to the ongoing proportional-integral closed-loop control signal.

In some examples, servo control processor 300 may impose threshold conditions before implementing the frequency offset initializer 301 or its output, such as detecting whether the received spindle speed error signal is indicative of a spindle speed error within a nominal spindle speed error range. In one illustrative example, servo control processor 300 may enforce a nominal spindle speed error range of between 0.04% and 0.78% of spindle speed. In other examples, servo control processor 300 may use other lower and upper nominal operating bounds greater or less than these specific example values, as described below. Servo control processor 300 may implement output of an initial proportional frequency offset initializer signal in response to detecting that the received spindle speed error signal is indicative of a spindle speed error within the nominal spindle speed error range, and prevent an output of an initial proportional frequency offset initializer signal in response to detecting that the received spindle speed error signal is indicative of a spindle speed error above a nominal maximum (e.g., 0.78%) or below a nominal minimum (e.g., 0.04%), and outside of the nominal spindle speed error range.

Servo control processor 300 may thus be configured to output an ongoing control signal from closed-loop control circuit 310, after receiving the initial frequency offset signal proportional to the spindle speed error signal as an input to closed-loop control circuit 310. Servo control processor 300 is also thus configured as illustratively described above to transition from outputting the initial frequency offset control signal to outputting the ongoing control signal, for normal ongoing servo control and read/write operations, responsive to the current timing error signal of closed-loop control circuit 310 converging to within its nominal convergence threshold.

Servo control processor 300 may comprise hardware-assisted servo control firmware, or a specialized, integrated combination of control electronic hardware and fast processing circuitry hosting control firmware integrated with the control electronic hardware, that are specialized to exert realtime servo control. In this context, this fast, realtime servo control processing circuitry may be "fast" as interpreted relative to other processor options in this context, as understood by persons skilled in the art, and such as to implement "realtime" control, such as is enabled by hardware-assisted firmware and may not be enabled by less specialized architectures, and as understood by persons skilled in the art, in various examples.

Figure 4:
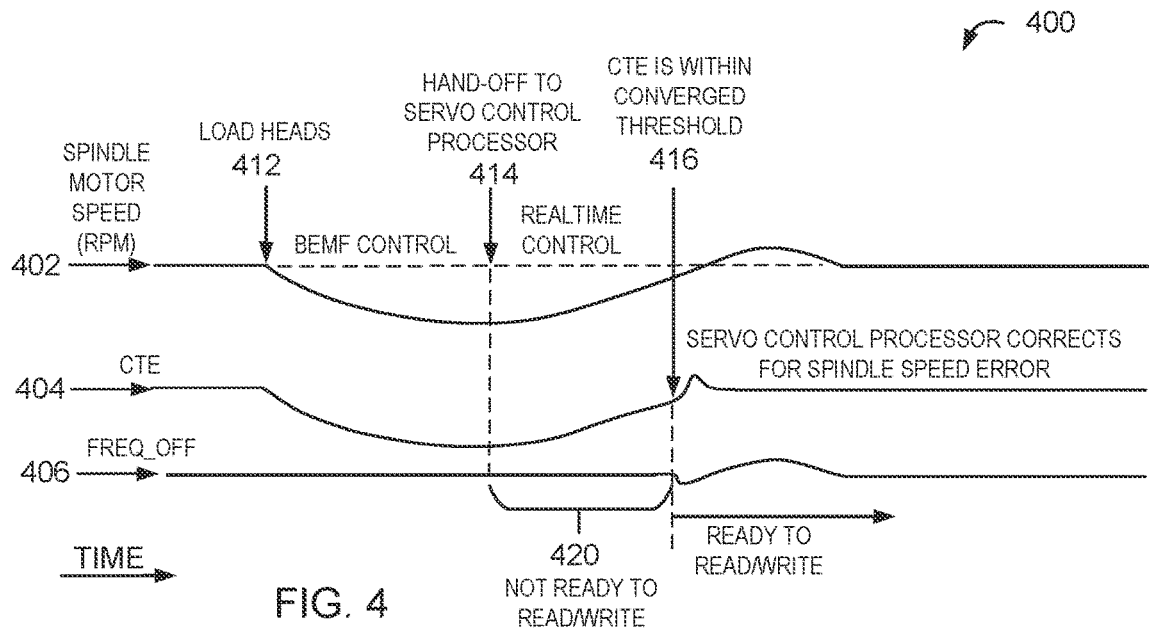
FIG. 4 depicts a graph of rotational spindle motor speed, current timing error (CTE), and frequency offset control signal over time, covering loading of the heads onto the disks and control hand-off from BEMF mode to servo control mode, for an example conventional disk drive in the prior art, as a basis to help illustrate various example inventive advantages of this disclosure as a basis of contrast therewith.
Figure 5:
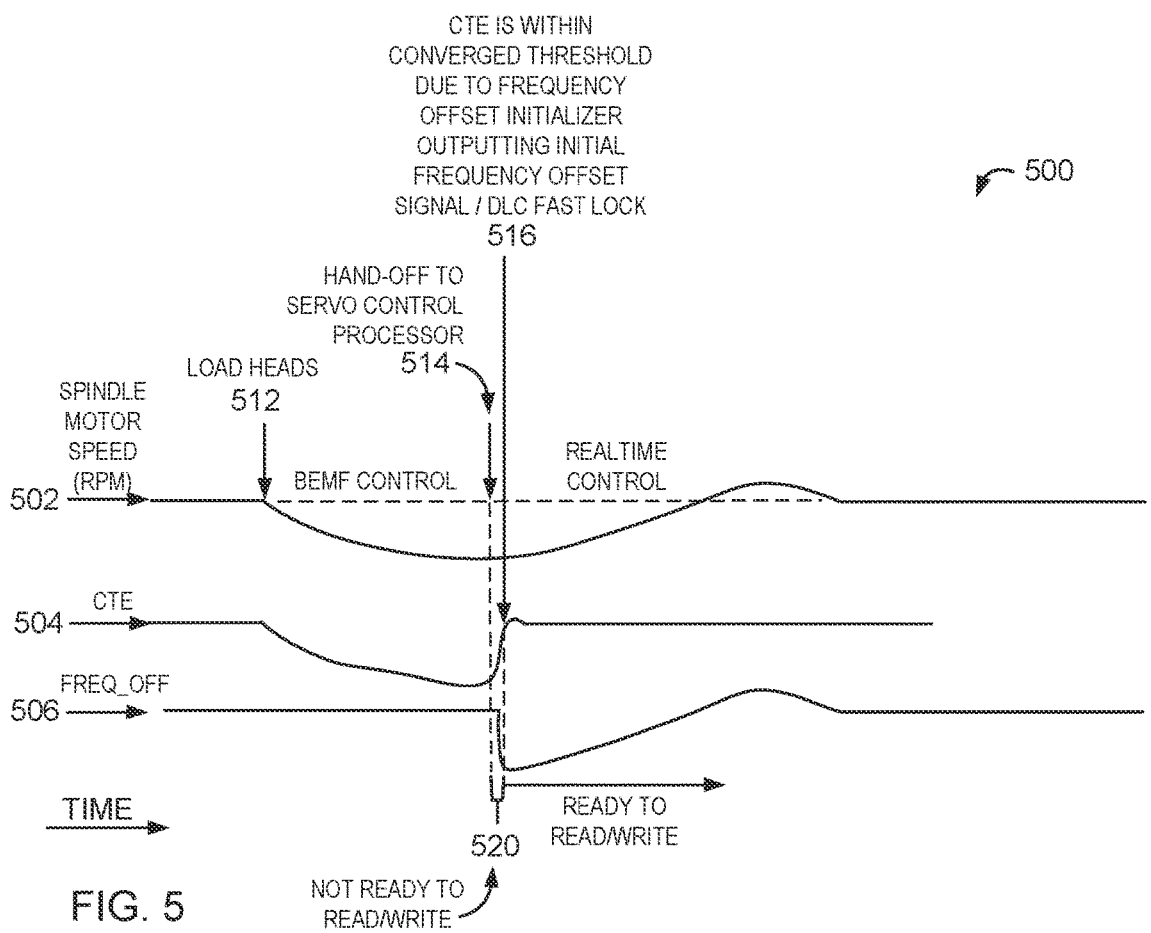
FIG. 5 depicts a graph of rotational spindle motor speed, current timing error (CTE), and frequency offset control signal over time, covering loading of the heads onto the disks and control hand-off from BEMF mode to servo control mode, in accordance with aspects of this disclosure.

FIG. 4 depicts a graph 400 of rotational spindle motor speed 402, current timing error 404, and frequency offset control signal 406 (each in their own suitable measurement units, graphically stacked for convenient comparison and not with a meaningful relationship between the variables along the y axis), over time (along the x-axis), covering loading of the heads onto the disks and control hand-off from BEMF mode to servo control mode, for an example conventional disk drive in the prior art, as a basis to help illustrate various example inventive advantages of this disclosure as a basis of contrast therewith. FIG. 5 depicts a graph 500 of rotational spindle motor speed 502, current timing error 504, and frequency offset control signal 506 over time, covering loading of the heads onto the disks and control hand-off from BEMF mode to servo control mode, in accordance with aspects of this disclosure.

FIGS. 4 and 5 demonstrate various example inventive advantages of this disclosure. For example, the prior art disk drive has a substantial time interval 420 (e.g., a large fraction of a second) after loading of the heads onto the disks 412 and control hand-off 414 from BEMF mode to servo control mode, in which the servo control processor is incapable of accurately determining control data, such as fly height of the heads, and incapable of engaging in reliable read or write operations, before the time 416 when the current timing error converges within the error threshold.

In sharp contrast, a disk drive in accordance with an example of this disclosure, as shown in FIG. 5, enables a substantially shortened time interval 520 after loading of the heads 512 and control hand-off 514 from BEMF mode to servo control mode before the time 516 when the current timing error converges within the error threshold due to frequency offset initializer 301 outputting an initial frequency offset based on the servo spindle speed error, and the servo control processor is capable of accurately determining control data, such as fly height of the heads, and of initiating reliable read or write operations. For example, in various examples of this disclosure, the servo control processor is capable of accurately determining control data, such as fly height of the heads, and of initiating reliable read/write operations after a very short time interval in relative context, e.g., as soon as physically possible within hardware limitations after the heads first encounter the servo wedges after hand-off from BEMF mode to servo control mode, constrained only by data signal transmission between the heads and the servo control processor and the control processing speed of the servo control processor.

In both FIGS. 4 and 5, spindle motor speed 402, 502, respectively, of the spindle motor driving the rotation of the disks, show a substantial deceleration initiated by initial loading 412, 512, respectively of the heads onto the disks (that is, loading the heads into nominal positions within extremely proximate aerodynamically suspended gaps (e.g., measured in single-digit nanometers or single-digit angstroms/hundreds of picometers, in some examples) above their corresponding disk surfaces), which induces a sudden increase in friction (aerodynamic drag associated with the aerodynamic interactions between the suddenly closely proximate heads and disk surfaces), while the disk drive is still in BEMF mode. In the scenarios of both FIGS. 4 and 5, the spindle motor speed 402, 502, respectively, experiences a sudden initial deceleration in response to loading of the heads, then undergoes a more gradual decrease in deceleration and then gradual acceleration in an approximately sinusoidal recovery to nominal value, including a small overshoot oscillation about nominal level, before settling back to approximately nominal speed. Both FIGS. 4 and 5 also show corresponding substantial dips in current timing error (CTE) proportional to the spindle motor speed error, though the trajectory of current timing error recovery is substantially different in FIG. 5, as further explained below. Also in both the scenarios of FIGS. 4 and 5, the disk drive hands off control, at 414, 514, respectively, from BEMF mode to servo processor control mode coinciding approximately with the nadir of the spindle motor speed and the current timing error.

As FIG. 4 shows, in the example prior art disk drive, the disk drive servo control processor has its proportional-integral closed-loop control inherently maintain the frequency offset signal 406 at zero throughout the substantially lengthy time interval after hand-off of control from BEMF to the servo control processor. Its proportional-integral control loop, starting with zero output and its integral component initially measuring and outputting zero integral of error over time, and with current timing error too far off from nominal, is incapable of correcting for current timing error, and thus incapable of enabling initiating read/write operations, for a substantial interval of time, and during passage of several servo wedges by the heads, until the spindle speed returns to close to its nominal value and the spindle speed error returns to within a relatively low threshold, and the current timing error converges to within a relatively low current timing error threshold, e.g., to within 0.08%.

In sharp contrast, as FIG. 5 shows, an example servo control processor of this disclosure begins outputting an advantageously determined frequency offset signal effectively as rapidly as possible within hardware limitations of reading and processing the first servo wedge encountered by the heads after control hand-off from BEMF mode to the servo control processor. The inventive insights of this disclosure include that detecting the spindle speed error and initializing servo control with an initial frequency offset signal proportional to the spindle speed error signal enables the current timing error to be corrected rapidly, e.g., limited only by the time required to detect and process the first servo wedge signal after control hand-off from BEMF mode to servo processor control mode. As FIG. 5 shows, in this illustrative example, after control hand-off from BEMF mode to the servo control processor, such that the example servo control processor of this disclosure takes control, the servo control processor very rapidly detects the spindle speed and then very rapidly (relative to the applicable time scales) outputs a substantial, initial, negative frequency offset signal (after the start of brief interval 520), proportional to the initial detected spindle motor speed after servo control processor receives control (at 514).

Among the inventive aspects of this disclosure, this sudden negative spike in frequency offset signal, proportional to initial detected spindle speed error, feeds back into the input of the proportional-integral closed-loop control circuit, and is an effective substitute for an accumulated integral control signal integrated over a much longer interval of time, as an initial input to the integral control branch of the proportional-integral closed-loop control circuit, in lieu of allowing the integral control branch merely to start from zero signal and integrate current timing error from zero over time. The sudden, substantial negative value of the frequency offset signal, after control by the servo control processor is initiated, may be modeled as having the effect of substituting for the integral control branch having been able to integrate current timing error 504 over time since prior to the servo control processor coming online (at 514), as if the proportional-integral closed-loop control circuit had been able to process the current timing error 504 over time prior to coming online, in some examples.

Thus, after that initializing frequency offset signal proportional to the initially detected spindle speed error, servo control processor is enabled to interrupt the gradual trend curve of approximately sinusoidal rebound of the current timing error rapidly after taking control (at 514) and instead suddenly, sharply accelerate current timing error (during brief interval 520) to within its nominal threshold (at 516), and then rapidly stabilize current timing error within that nominal threshold (from 516 onward). The servo control processor thus enforces a fast lock onto a nominal disk lock clock.

As graph 500 shows, after generating the initial frequency offset signal and enabling the disk lock clock fast lock (at 516), the servo control processor delivers a nominal current timing error, within a nominal threshold of zero (e.g., within 0.08% in some examples), from convergence to nominal threshold at 516 onward, indicative of delivering a nominal disk lock clock signal. As graph 500 further shows, from disk lock clock fast lock 516 onward, the frequency offset signal 506 implements a proportional-integral tracking of the spindle speed 502.

Disk lock clock fast lock examples of this disclosure have been implemented and subjected to testing. The results of the testing have verified that that the conventional erroneous fly height data and inability to perform nominal read/write operations during the initial interval of servo processor control after loading the heads onto the disks are fully resolved by the tested implementations of this disclosure as described above, which instead provide for nominal fly height data and nominal read/write operations within a rapid, e.g., hardware-limited, interval after only the minimal processing time needed to process the servo signal from, e.g., the first encounter of the heads with servo wedges of the disk surfaces, rather than after the conventional non-converged settling time interval, spanning several servo wedge encounters by the heads. In other words, a disk drive servo control processor of this disclosure may therefore enable read/write operations substantially more rapidly than in the prior art, e.g., as soon as theoretically possible within the other engineering constraints of systems of this disclosure, and without any control loop converging time delay, after the disk drive hands off control from BEMF mode to servo control processor control mode, in various examples.

A disk lock clock fast lock of this disclosure may also offer relatively even greater advantages in reliable switching to realtime mode under the control of a servo control processor in disk drives having relatively larger numbers of disks (or platters), such as in disk drives having ten or eleven or more disks, in some illustrative examples; or with numbers of disks less then or greater than these numbers in other examples. Disk drives with relatively larger numbers of disks may have larger initial spindle speed errors than disk drives with average or relatively fewer numbers of disks, due to factors such as more than proportionally greater mechanical complexity and moments of rotational inertia of the stack of disks, in some examples, and may have relatively longer time durations of relatively large initial spindle speed error, and may thus gain accordingly even greater benefit with implementations of a disk lock clock fast lock of this disclosure.

In some examples, a servo control processor of this disclosure may impose prerequisite conditions on initializing the proportional-integral closed-loop control circuit with an initial frequency offset control signal proportional to the spindle speed error signal. For example, a servo control processor may first perform a screening evaluation and determine whether a detected initial spindle speed error is within an expected nominal range of initial spindle speed error (separate from the ongoing steady-state nominal spindle speed error), and not above or below the expected nominal initial range, and then only output the initial frequency offset signal proportional to the initial spindle speed error signal as output and as initial feedback to the proportional-integral closed-loop control circuit if the detected initial spindle speed error is within the nominal initial range. In one illustrative example, the nominal initial range for the servo control processor to screen for before activating the initializer frequency offset signal may be between 0.04% and 0.78% of spindle speed. In other examples, the nominal range lower bound may be lower or higher than 0.04% of spindle speed and the nominal range upper bound may be lower or higher than 0.78% of spindle speed. Performing this nominal range screening evaluation may avoid performing an initial proportional spindle speed error signal injection under the influence of anomalous scenarios. In the event of detecting the spindle speed error outside of the nominal range, the control circuitry may perform an alternative action to address the anomalous state.

In some examples in general, the lower bound of this nominal range may be determined with reference to the nominal current timing error threshold, such as a selected substantial fraction of the nominal current timing error threshold for convergence of the current timing error. As an example rationale for this, if the current timing error is already under some value that is significantly less than the nominal current timing error threshold itself, then the current timing error may already be converged or converging (e.g., for some reason, the heads have already been loaded onto the disks for a longer interval than expected and the spindle speed has already re-stabilized prior to the servo control processor coming online), and activating the proportional-integral closed-loop control is therefore already likely to be successful, without initializing with the frequency offset initializer. In the example of a 0.04% lower bound, the nominal current timing error threshold may be 0.08% of the nominal current timing error, and the lower bound of the nominal range for activating the frequency offset initializer may be selected as half of that 0.08% of the nominal current timing error threshold. In other examples, the nominal current timing error threshold may be selected as another value relatively close to zero, greater or less than 0.08%, and the lower bound of the nominal range for activating the frequency offset initializer may be selected as another value on the order of the nominal current timing error, such as some other large fraction of the nominal current timing error threshold (e.g. approximately one quarter, one third, two fifths, three eighths, one half, five eighths, three fifths, two thirds, three quarters) or some other value relatively close to the nominal current timing error threshold (e.g., equal to the nominal current timing error threshold, 1.1 or 1.2 times the nominal current timing error threshold).

In some examples in general, the upper bound of this nominal range to screen for before activating the frequency offset initializer may be determined with reference to hardware limitations, such as in a hardware-limited maximum frequency offset control signal that servo control processor 300 is capable of outputting, or otherwise close to or on the order of a hardware-limited nominal maximum output signal amplitude of servo control processor 300 or of proportional-integral feedback closed-loop control circuit 310 thereof. In other examples, the upper bound of this nominal range may be determined with reference to other criteria, such as likely limitations on how large the initial current timing error is capable of being under nominal scenarios, with an upper bound selected such that a reading beyond the selected upper bound may be more likely to be an anomalous reading rather than a reliable reading of a current timing error that large.

Servo control processor 300 may thus be configured to determine whether the spindle speed error signal is within a nominal range of initial spindle speed error, and output the initial frequency offset control signal proportional to the spindle speed error signal in response to determining that the spindle speed error signal is within the nominal range. Servo control processor 300 determining whether the spindle speed error signal is within the nominal range of initial spindle speed error may include determining whether the spindle speed error signal is at least above a lower bound selected as a value on the order of a nominal threshold of a current timing error signal of the servo control processor. Servo control processor 300 determining whether the spindle speed error signal is within the nominal range of initial spindle speed error may include determining whether the spindle speed error signal is at most below an upper bound selected as a value on the order of a hardware limitation of a frequency offset signal amplitude the servo control processor is nominally capable of outputting.

In some examples, a disk drive of this disclosure may comprise multiple actuator arms, and a servo control processor may receive servo timing data from the multiple actuator arms, and output servo control signals to the multiple actuator arms. The servo control processor may receive servo timing data from each actuator arm individually, or from the multiple actuator arms in an integrated combination of servo data from the multiple actuator arms, and may output servo control signals to the actuator arms individually, or as a single set of servo control signals outputted and distributed to the multiple actuator arms, in various examples.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position one or more heads proximate to the one or more disks;
   a spindle motor configured for rotating the one or more disks; and
   one or more processing devices comprising a servo control processor, wherein the servo control processor comprises a closed-loop control system and is configured to:
      receive a spindle speed error signal indicative of an error in a rotational speed of the spindle motor;
      output an initial frequency offset signal, wherein the initial frequency offset signal is proportional to the spindle speed error signal; and
      receive the initial frequency offset signal proportional to the spindle speed error signal as an input to the closed-loop control system.

2. The data storage device of claim 1, wherein the servo control processor is further configured to:
   output an ongoing control signal from the closed-loop control system, after receiving the initial frequency offset signal proportional to the spindle speed error signal as an input to the closed-loop control system.

3. The data storage device of claim 2, wherein the servo control processor is further configured to transition from outputting the initial frequency offset control signal to outputting the ongoing control signal, responsive to a current timing error signal of the servo control processor converging to within a convergence threshold.

4. The data storage device of claim 1, wherein the closed-loop control system comprises a proportional-integral closed-loop control system.

5. The data storage device of claim 4, wherein the servo control processor further comprises:
   a frequency offset initializer, configured to receive the spindle speed error signal, and to output the initial frequency offset signal; and
   a summation node, coupled to outputs of the proportional-integral closed-loop control system and the frequency offset initializer.

6. The data storage device of claim 5, wherein the summation node is configured to output a weighted summation of the initial frequency offset signal and an ongoing control signal from the closed-loop control system, after receiving the initial frequency offset signal proportional to the spindle speed error signal as an input to the closed-loop control system.

7. The data storage device of claim 1, wherein the servo control processor is further configured to:
   detect the error in the rotational speed of the spindle motor; and
   generate the spindle speed error signal, based on the detected error in the rotational speed of the spindle motor.

8. The data storage device of claim 7, wherein detecting the error in the rotational speed of the spindle motor comprises detecting the spindle speed via receiving a servo read signal from performing a read operation via the one or more heads of one or more servo wedges on disk surfaces of the one or more disks.

9. The data storage device of claim 8, wherein detecting the spindle speed further comprises receiving the servo read signal from performing a read operation via the one or more heads of a first vertical stack of the one or more servo wedges encountered by the one or more heads after the one or more processing devices initialize control by the servo control processor.

10. The data storage device of claim 1, wherein the servo control processor is further configured to:
    determine whether the spindle speed error signal is within a nominal range of initial spindle speed error; and
    output the initial frequency offset control signal proportional to the spindle speed error signal in response to determining that the spindle speed error signal is within the nominal range of initial spindle speed error.

11. The data storage device of claim 10, wherein determining whether the spindle speed error signal is within the nominal range of initial spindle speed error comprises determining whether the spindle speed error signal is at least above a lower bound selected as a value on an order of a nominal threshold of a current timing error signal of the servo control processor.

12. The data storage device of claim 10, wherein determining whether the spindle speed error signal is within the nominal range of initial spindle speed error comprises determining whether the spindle speed error signal is at most below an upper bound selected as a value of a hardware limitation of a frequency offset signal amplitude the servo control processor is nominally capable of outputting.

13. The data storage device of claim 1, wherein the one or more disks comprise ten or more disks.

14. A method comprising:
    receiving, by one or more processing devices, a spindle speed error signal indicative of an error in a rotational speed of a spindle motor configured for rotating one or more disks of a data storage device;

outputting, by the one or more processing devices, an initial frequency offset signal, wherein the initial frequency offset signal is proportional to the spindle speed error signal; and receiving the initial frequency offset signal proportional to the spindle speed error signal as an input to a closed-loop control system.

15. The method of claim 14, further comprising:

transitioning from outputting the initial frequency offset control signal to outputting an ongoing control signal from the closed-loop control system, responsive to a current timing error signal of a servo control processor converging to within a convergence threshold; and wherein the closed-loop control system comprises a proportional-integral closed-loop control system.

16. The method of claim 14, further comprising:

detecting the error in the rotational speed of the spindle motor, via receiving a servo read signal from a first vertical stack of one or more servo wedges on disk surfaces of the one or more disks encountered by one or more heads after servo control is initialized; and generating the spindle speed error signal, based on the detected error in the rotational speed of the spindle motor.

17. One or more processing devices comprising:

means for receiving a spindle speed error signal indicative of an error in a rotational speed of a spindle motor configured for rotating one or more disks of a data storage device;

means for receiving an initial frequency offset signal proportional to the spindle speed error signal as an input to a closed-loop control system; and means for outputting an ongoing control signal from the closed-loop control system, after receiving the initial frequency offset signal proportional to the spindle speed error signal as the input to the closed-loop control system.

18. The one or more processing devices of claim 17, further comprising:

means for transitioning from outputting the initial frequency offset control signal to outputting an ongoing control signal from the closed-loop control system, responsive to a current timing error signal of a servo control processor converging to within a convergence threshold, wherein the closed-loop control system comprises a proportional-integral closed-loop control system.

19. The one or more processing devices of claim 17, further comprising:

means for detecting the error in the rotational speed of the spindle motor, via receiving a servo read signal from a first vertical stack of one or more servo wedges on disk surfaces of the one or more disks encountered by one or more heads after servo control is initialized; and means for generating the spindle speed error signal, based on the detected error in the rotational speed of the spindle motor.

* * * * *